Jan. 4, 1927. Re. 16,517

P. GARDNER

MACHINE FOR FORMING TUBULAR FABRICS

Original Filed Sept. 19, 1925 6 Sheets-Sheet 1

WITNESSES

E. A. Wilson

Guy R. Miller

INVENTOR

Percy Gardner

BY Munn & Co.

ATTORNEYS

Jan. 4, 1927. Re. 16,517

P. GARDNER

MACHINE FOR FORMING TUBULAR FABRICS

Original Filed Sept. 19, 1925 6 Sheets-Sheet 2

WITNESSES

E. A. Wilson

Guy L. Hitt

INVENTOR

Percy Gardner

BY

Munn & Co.

ATTORNEYS

Jan. 4, 1927. P. GARDNER Re. 16,517

MACHINE FOR FORMING TUBULAR FABRICS

Original Filed Sept. 19, 1925 6 Sheets-Sheet 3

WITNESSES

Geo. W. Naylor

Hugh H. Ott

INVENTOR

Percy Gardner

BY Munn & Co.

ATTORNEYS

Jan. 4, 1927. P. GARDNER Re. 16,517

MACHINE FOR FORMING TUBULAR FABRICS

Original Filed Sept. 19, 1925 6 Sheets-Sheet 4

WITNESSES

Geo. W. Naylor

Hugh H. Clark

INVENTOR

Percy Gardner

BY Munn & Co

ATTORNEYS

Jan. 4, 1927. Re. 16,517
P. GARDNER
MACHINE FOR FORMING TUBULAR FABRICS
Original Filed Sept. 19, 1925 6 Sheets-Sheet 5
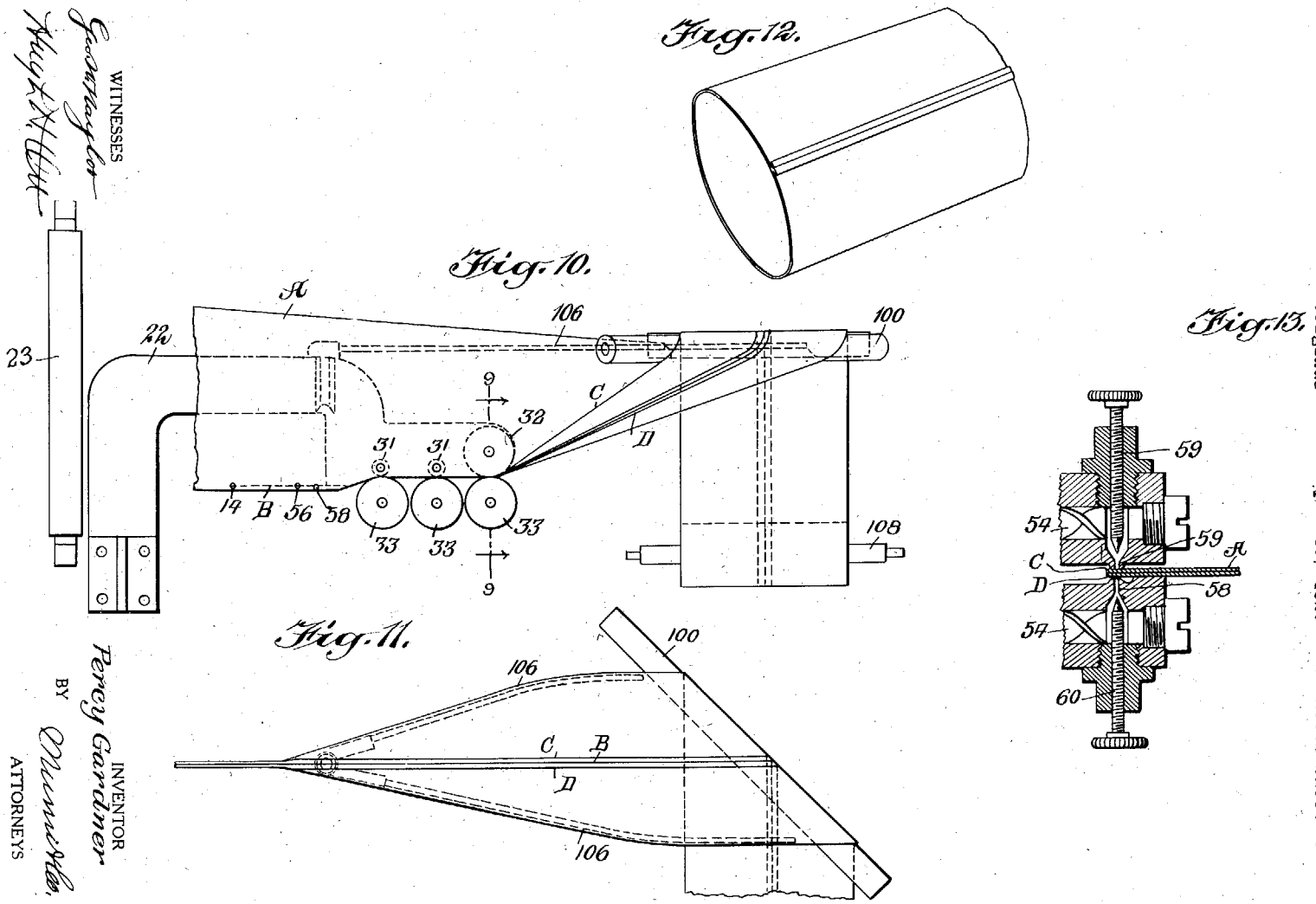
WITNESSES
INVENTOR
Percy Gardner
BY
ATTORNEYS Jan. 4, 1927. Re. 16,517

P. GARDNER

MACHINE FOR FORMING TUBULAR FABRICS

Original Filed Sept. 19 1925 6 Sheets-Sheet 6

WITNESSES

Geo. W. Naylor

Hugh A. Ott

INVENTOR

Percy Gardner

BY Munn & Co.

ATTORNEYS

Reissued Jan. 4, 1927. Re. 16,517

UNITED STATES PATENT OFFICE.

PERCY GARDNER, OF EAST ORANGE, NEW JERSEY, ASSIGNOR TO H. M. BUNKER & COMPANY, INC., OF NEW YORK, N. Y., A CORPORATION OF NEW YORK.

MACHINE FOR FORMING TUBULAR FABRICS.

Original No. 1,571,774, dated February 2, 1926, Serial No. 57,416, filed September 19, 1925. Application for reissue filed August 2, 1926. Serial No. 126,711.

This invention relates generally to a machine for stitching together the edges of a strip of material, opening up the free edges of the seam, and pressing down and securing said free edges, the same pertaining chiefly to an attachment for a sewing machine and working in conjunction therewith to produce a tubular material, which material is practically designed to be subsequently run through a bias cutting machine for the production of bias cloth. The tubular fabric thus formed is more especially adapted to be fed through and operated upon by the bias cutting machine of the type set forth in my United States Letters Patent No. 1,581,051, granted April 13, 1926.

In stitching together the edges of a strip of woven fabric or cloth, to produce a tubular material, it is necessary to open up the seamed edges, flatten out the same, and retain the seamed edges in their flattened out condition by pasting or otherwise securing said edges in place, whereby the tubes can be properly fed through and operated upon by the bias cutting machine. In order to render such a machine commercially practical it is furthermore essential to accomplish the seaming, the seam opening, the flattening out, and the securing operations in a minimum of time and at a considerably greater speed than such operations can be accomplished by hand.

It is, therefore, the outstanding object of the present invention to provide a machine for accomplishing such work in an expeditious, accurate, efficient and inexpensive manner.

More specifically, the invention comprehends a machine for seaming together the edges of a strip of woven cloth fabric or material in connection with means for applying the paste to the seamed edges, means for opening up said edges, flattening out and pressing the same together, with means for taking off and rolling up the material with the pasted seamed edges in such a manner as to preclude any tendency of spreading the pasted edges until the paste has had ample time to set and dry.

The invention furthermore comprehends in a machine of the character set forth, a mechanism for taking off and rolling up the tubular fabric, which mechanism disposes the flattened out pasted seam edge from its initial position at one side of the tube to a position central of the roll whereby adjacent convolutions of the roll tend to maintain the same in its opened up, flattened out condition.

As a still further object, the invention resides in the provision of means for synchronizing the feeding of the fabric or cloth at the take off point with the feeding mechanism of the seam stitching means.

The machine further comprehends a novel paste applying and distributing means by virtue of which a uniform quantity of paste is applied whereby excessive or underfeeding is precluded.

Another important object of the invention resides in the provision of an offset guide means between the seam-opening device and the take-off mechanism which compensates for the spreading or flattening out of the seamed portion and prevents strains or stresses which would otherwise be set up if the fabric were fed in a straight line between said points, which means specifically consists of an arm having a laterally offset or angular portion against which the opened up free edges of the seam are pressed.

Another feature of the invention embodied in the material rolling element of the take-off mechanism consists of means for compensating for the increase in the size of the roll so as to allow for a slippage to prevent longitudinal strains or stresses upon the pasted seamed fabric.

The invention furthermore contemplates a machine which is comparatively simple in its construction and mode of operation, which is inexpensive to manufacture and install and which is highly efficient in the purpose for which it is intended.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings:

Figure 10 is a diagrammatic plan view of the complete machine;

Figure 11 is a diagrammatic fragmentary view of the tube-spreading means;

Figure 12 is a perspective view of a section of the tubular fabric produced by the machine;

Figure 13 is a fragmentary sectional view taken approximately on the line 13—13 of Figure 14, illustrating the application of the paste to the seamed edges;

Figure 1:
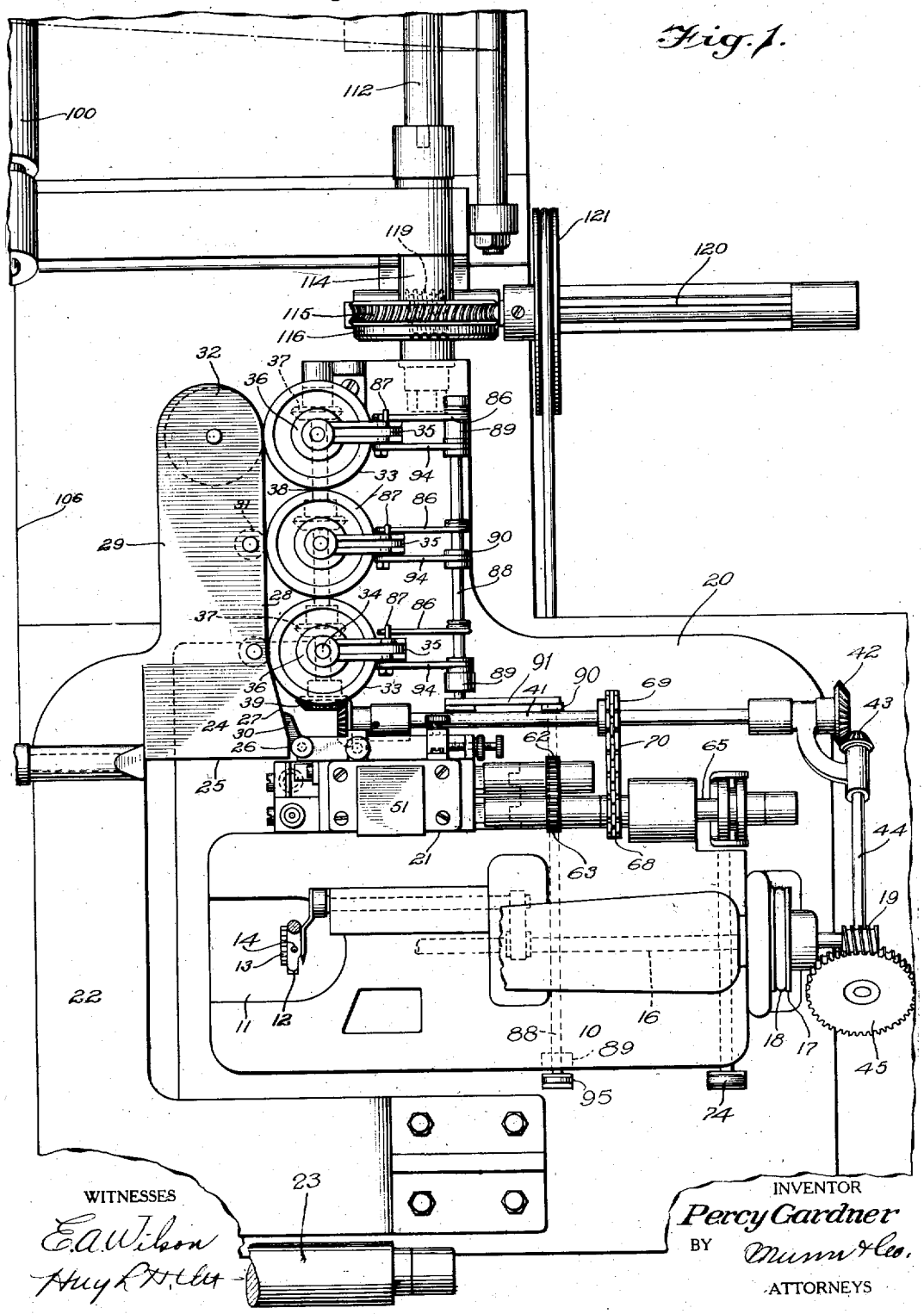
Figure 1 is a fragmentary plan view of the machine.
Figure 3:
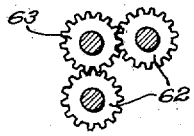
Figure 3 is a detail sectional view taken approximately on the line 3—3 of Figure 2, illustrating the driving pinions.
Figure 2:
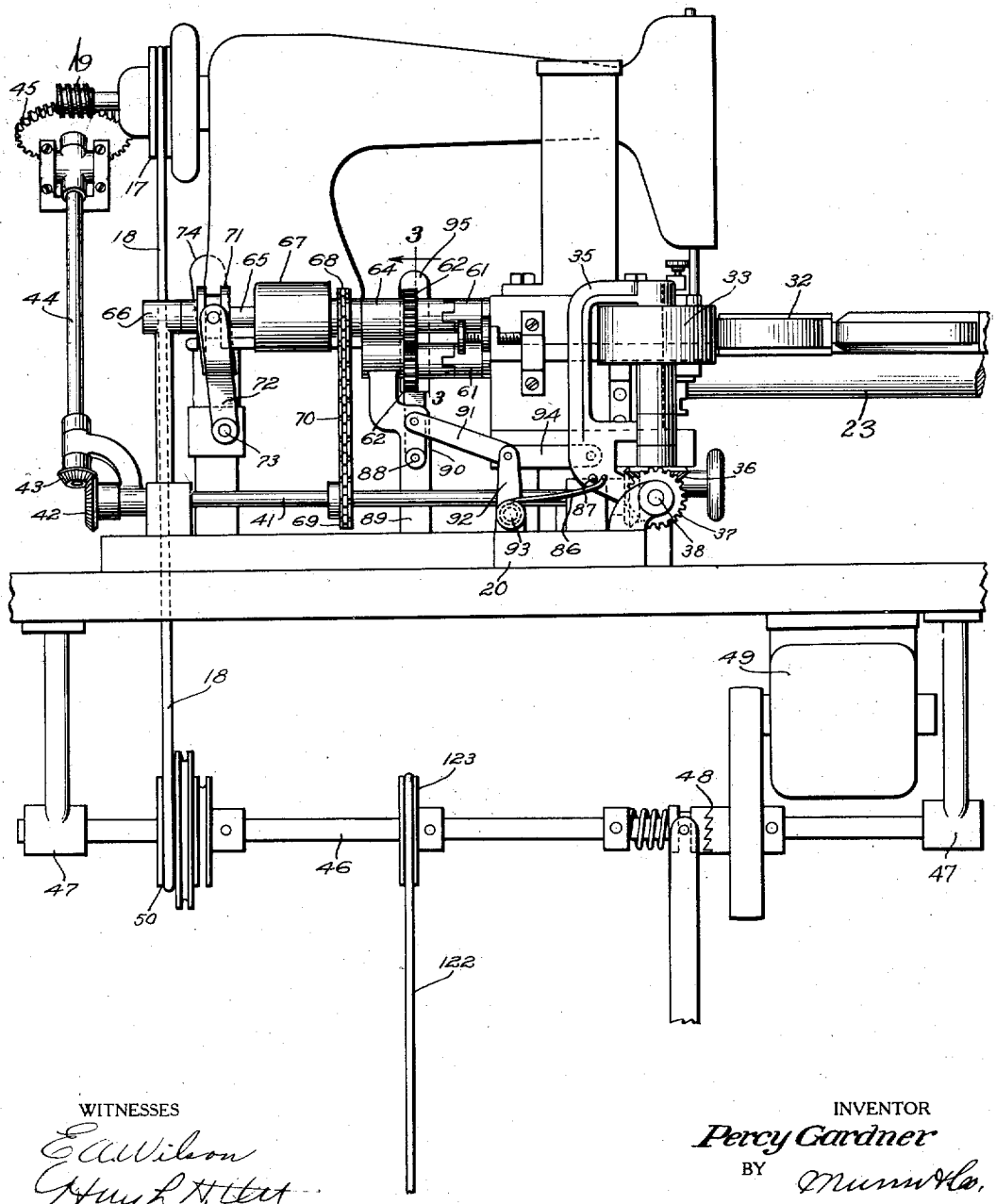
Figure 2 is a rear end view thereof with the take-off and rolling mechanism removed.
Figure 4:
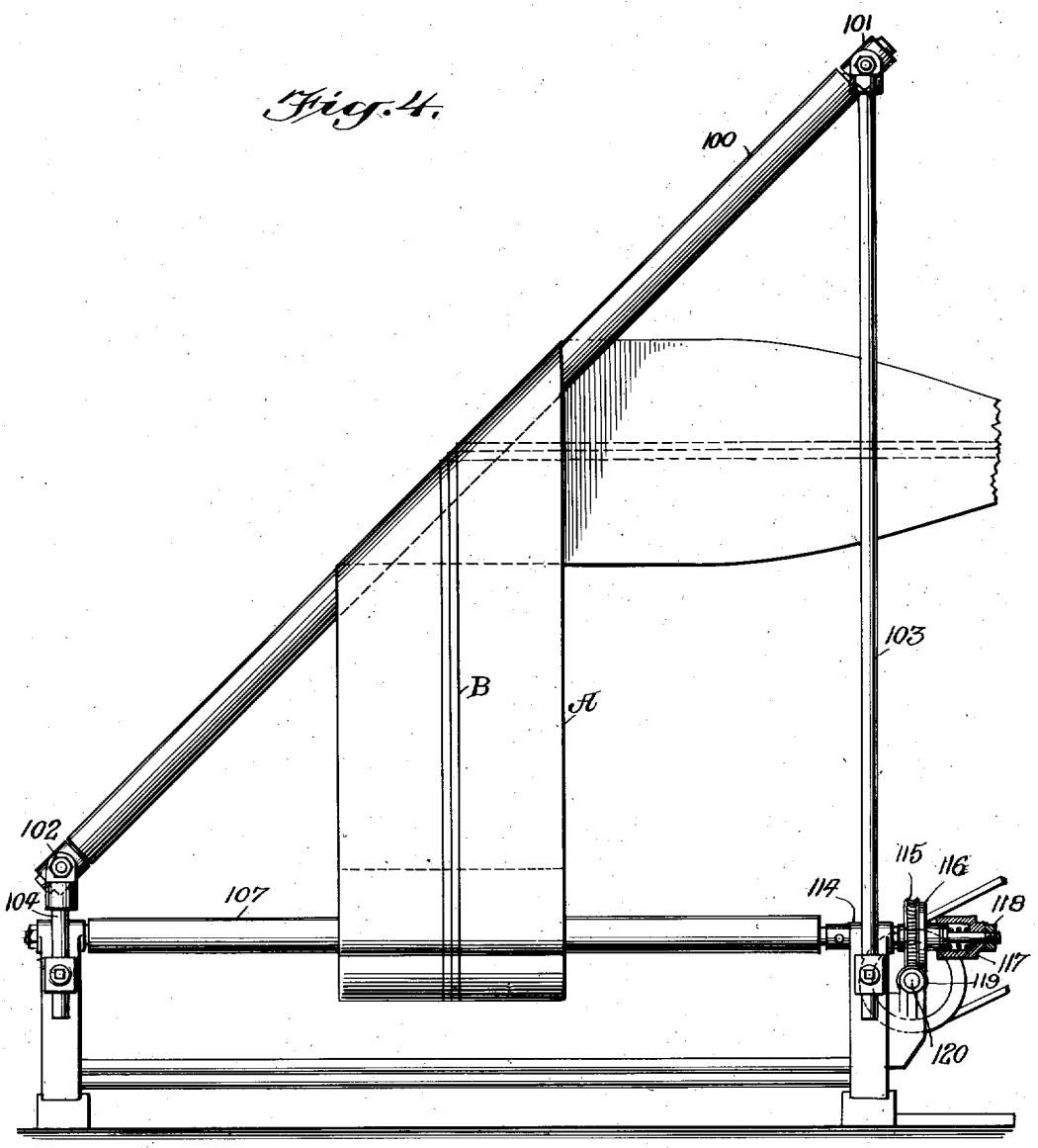
Figure 4 is a fragmentary side view of the take-off and rolling mechanism.
Figure 5:
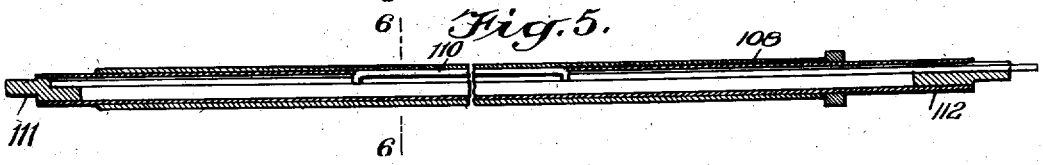
Figure 5 is a longitudinal sectional view through the roller shaft.
Figure 6:
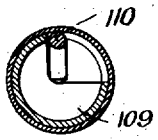
Figure 6 is a transverse section therethrough taken approximately on the line 6—6 of Figure 5.
Figure 8:
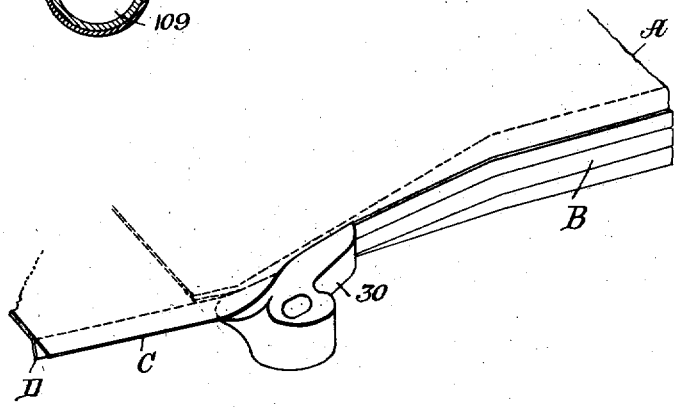
Figure 8 is a fragmentary perspective view illustrating diagrammatically the operation of the seam-opening means.
Figure 9:
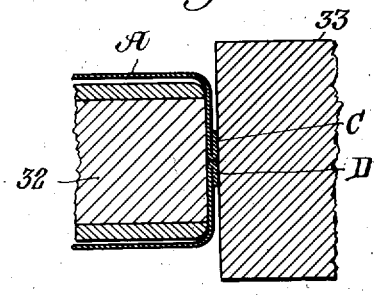
Figure 9 is a fragmentary detail sectional view taken approximately on the line 9—9 of Figure 10, illustrating the seamed edge pressing means in operation.
Figure 7:
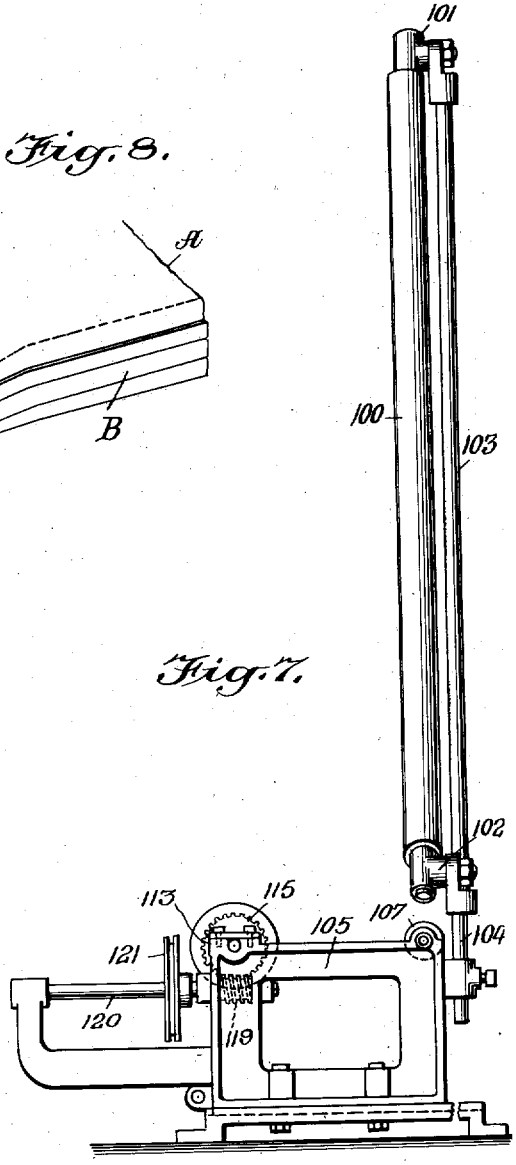
Figure 7 is a rear end view of the take-off and rolling mechanism.
Figure 14:
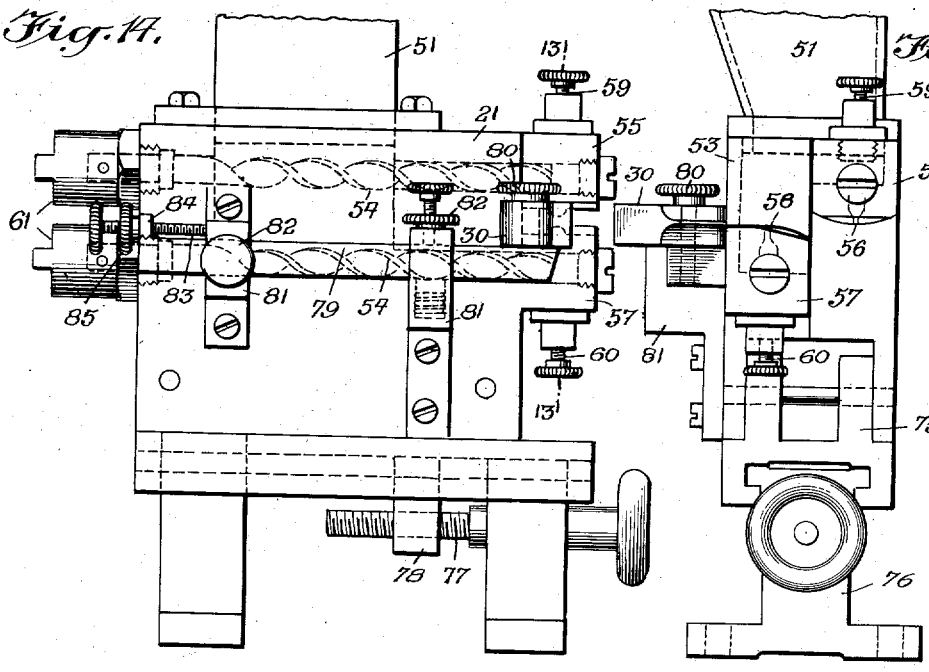
Figure 14 is a side view of the paste applying means.
Figure 15:
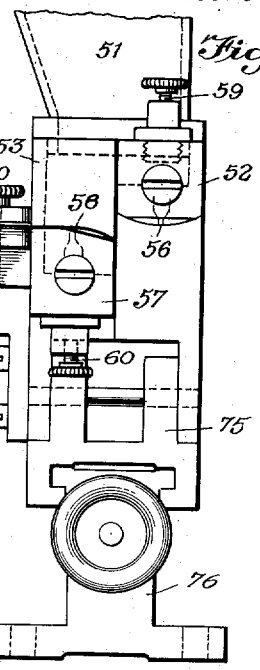
Figure 15 is an end view thereof.
Figure 16:
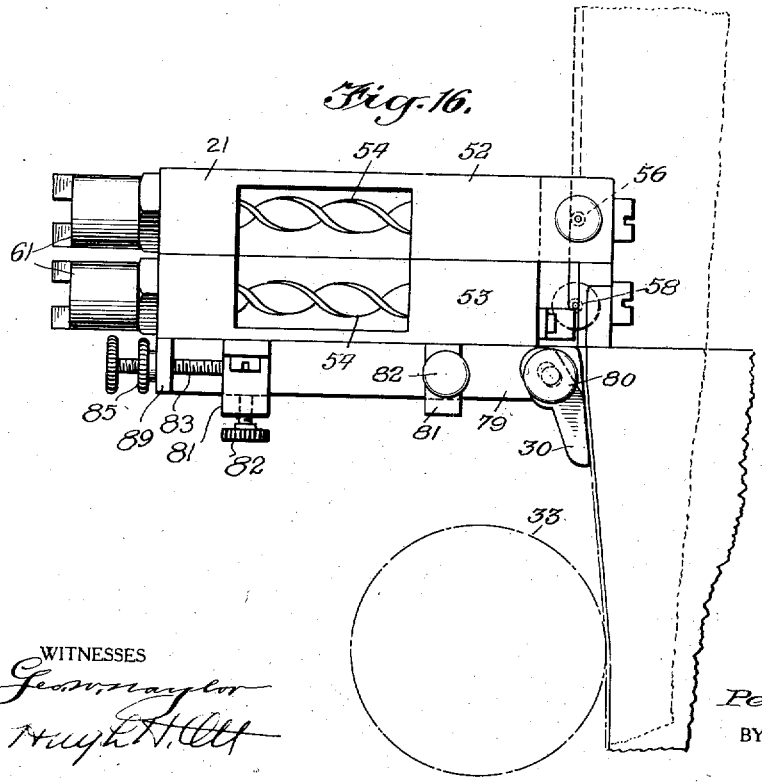
Figure 16 is a plan view of the same.

Referring to the drawings by characters of reference, 10 designates generally a sewing machine for accomplishing the seam stitching, and which means includes the usual bed 11, presser-foot 12, feed dog 13, needle 14 and a cutting or trimming knife 15 for trimming off the free edges of the seamed portion after the stitching operation. The operating shaft 16 of the machine is driven in any suitable manner, such as by a pulley 17, over which a belt 18 is trained. The outer end of the operating shaft is extended beyond the pulley 17 and is provided with a worm 19 for a purpose to be hereinafter set forth. The sewing machine is supported on a suitable table 20, which extends rearwardly beyond the machine proper and supports a pasting unit designated generally at 21. The table 20 also supports an arm 22 in advance of which a roller 23 is mounted over which roller the material is fed in centrally longitudinal folded condition with the upper and lower folds trained over and under the arm 22. The free edges of the material are brought together and stitched by the machine with the edges trimmed by the knife 15 after which the trimmed seamed edges are trained through the pasting unit. The arm 22 is provided with a laterally projecting portion 24 having its forward edge 25 disposed substantially in alinement with the rear edge of the paste-applying unit 21. The free outer side edge 26 of the portion 24 is disposed in alinement with the needle and paste applying means for a short distance after which the same inclines laterally inward at 27 and merges into the free outer side edge 28 of the rear extension 29 of the arm. Under this arrangement it will be noted that the edge 28 of the extension 29 is laterally offset from the edge 26 of the portion 24 of the arm.

At a point adjacent the juncture of the inclined edge 27, with the straight edge 26, a seam-opening element 30 is mounted for opening up the free edges of the material beyond the stitched seam and for turning the same down into flat contact with the body of the material against the edge 27. The extension 29 has mounted therein and slightly protruding from its free outer side edge 28, a plurality of rollers 31 in longitudinally spaced relation, and at its rear terminal an enlarged roller 32. Correspondingly spaced feed rollers 33 are mounted on vertical shafts 34 journaled in brackets 35 pivotally supported from the table 20. The shafts 34 are each provided at its lower end with a bevel pinion 36, which pinions mesh with bevel gears 37 on a horizontally mounted shaft 38, which also constitutes the pivotal mounting means for the brackets 35. The forward end of the shaft 38 is operatively connected through intermeshing bevel pinions 39 and 40, with a countershaft 41 for driving the feed rollers 33 in unison.

The countershaft 41 has secured to its opposite end a bevel gear 42, which meshes with and is driven by a bevel pinion 43 on a drive shaft 44, which drive shaft is in turn operatively driven from the worm 19 by means of a worm wheel 45 meshing therewith and secured on the remaining end of the drive shaft 44. A power shaft 46 is loosely journaled in hanger bearings 47 supported from the under side of the table and is respectively coupled and uncoupled by a clutch 48, with a motor 49. The power shaft is provided with a drive pulley 50, around which the belt 18 is trained.

The pasting unit designated generally at 21, includes a container or hopper 51, which communicates at its lower open end with the paste-receiving and feeding boxes 52 and 53, within each of which a spiral conveyor 54 is mounted. The box 52 with its conveyor is disposed in a plane above the box 53 and is provided with an extension 55 having an apertured applying nozzle 56 on its under side, and the box 53 is formed with an extension 57 having an apertured applying nozzle 58 on its upper side. This arrangement disposes the lower end of the upper nozzle 56 and the upper end of the lower nozzle 58 in relative position to each other to effect the application of paste to the upper face of the upper seamed edge and the lower face of the lower seamed edge of the material as the same passes between the nozzles. The quantity or amount of paste fed through the nozzles 56 and 58, is controlled by needle valve stems 59 and 60. The outermost ends of the spiral conveyors 54 are secured to rotary heads 61, which are keyed to the pinions 62. The pinions 62 are driven in the same direction by a drive pinion 63, which meshes with both pinions 62. The pinion 63 is secured to a sleeve 64, which sleeve 64 is secured to a shaft 65 loosely mounted in a bearing 66 and extending through a clutch 67. The clutch 67 is driven by a sprocket 68 from a sprocket 69 on the countershaft 41, by means of a sprocket chain 70 trained thereabout. The movable clutch element 71 for coupling and uncoupling the shaft 65 with the driven clutch 67, is actuated by means of a fork 72 on a shaft 73 which extends forwardly and is provided with an operating handle 74 adjacent the forward portion of the table. The pasting unit is uncoupled when the machine is initially started and until a sufficient length of material has been stitched to reach from the needle 14 to the seam opening element 30, after which the pasting unit is brought into operation by shifting the manipulating handle 74.

The paste-receiving and feeding boxes are secured together and mounted for lateral sliding movement on a carriage 75, and guided upon a base 76 secured to the table 20. The lateral adjusting of the pasting unit is accomplished by means of a jack screw 77 threadedly engaged through a depending lug 78 on the pasting unit.

The seam-opening element 30 is pivoted for horizontal swinging movement on a bar 79, by means of a set screw 80. The bar 79 is slidable through yokes 81, which are secured to the pasting unit and set screws 82 extend through said yokes for holding the bar in adjusted position so that adjustment of the seam-opening element to coincide with the gage or thickness of the material, may be effected and maintained. In order to more accurately effect the sliding adjustment of the bar 79, a jack screw 83 is threaded through the upturned extremity 84 of the bar and engages with the outermost yoke 81, a tightening nut 85 being threaded on the jack screw for maintaining the adjustment.

The feeding roller brackets 35 are normally swung to a position to impinge and press the material between the feed rollers 33 and the rollers 31 by means of springs 86 which engage with the pins 87 on the brackets. In order to provide means for swinging the brackets in a direction to retract or disengage the rollers 33 from the material, a shaft 88 mounted in bearings 89 extends forwardly through the machine and has secured thereto a radial arm 90. The arm 90 is connected by a link 91, to the foremost of a number of radial arms 92 on a shaft 93, and the free ends of the remaining arms 92 are in turn respectively connected by links 94 to the brackets 35. The forward end of the shaft 88 has connected therewith a manipulated handle 95 which is disposed adjacent the forward portion of the machine.

The table 20 which has supported at its forward end in bearings, the transverse roller 23, receives thereon the strip of cloth or material A which is to be seamed and formed into the tube, said strip being doubled upon itself and trained over said roller 23 with the side edges brought together in superimposed relation to be disposed relatively to the presser foot and needle for forming the stitched seam B. The stitched seamed edges are then trained between the nozzles 56 and 58 and the stitched connection trained over the edges 26, 27 and 28 of the arm. The seam-opening device 30 is engaged between the free edges C and D extending beyond the stitched seam B, to effect the opening up and initial pressing down of said edges in flat contact with the body of the material. The feed rollers 33 in addition to feeding the material over the side edges of the arm, tend further to press down the edges C and D.

In order to provide means for taking off and rolling up the material so as to prevent any strain or tension thereon which might tend to open up the stitched and pasted-down seamed edges until after the paste has had an opportunity to set and dry, a taking-off and rolling-up mechanism has been devised, which consists of an angularly disposed roller 100, which is preferably arranged on a forty-five degree angle to the horizontal and spaced laterally with respect to the take-off point of the material from between the rollers 32 and 33. The roller 100 is mounted for free turning movement in upper and lower bearings 101 and 102 supported by the standards 103 and 104 from the framework 105. In order to effect an even vertical expansion of the tube of fabric as it travels from between the rollers 32 and 33, whereby the flattened-out, pasted-down seam B may be disposed medially of the width of the fabric as it passes over the angular roller 100, a pair of spring tensioned arms 106 are supported from the arm 22.

From the inclined roller 100 the fabric tube is trained downwardly and around and under a guide roller 107 thence laterally with its leading end secured to a winding core 108. The winding core 108 is of tubular formation and is removably mounted over a hollow shaft 109, the same being locked thereto by an eccentric friction lock 110. The opposite ends of the hollow shaft have secured therein and partially projecting therefrom, trunnions 111 and 112, the former being journaled in a bearing 113 and the latter extending through a bearing 114. The trunnion 112 projects beyond the bearing 114 and has loosely mounted thereon a worm wheel 115 and secured thereto a spring-pressed friction clutch 116 normally forced into frictional contact with a side of the worm wheel by a spring 117 in a housing 118. A worm 119 meshes with the worm wheel 115 and a worm shaft 120 has secured thereon a sheave or pulley 121 which is driven by a belt 122 trained around a drive sheave or pulley 123 on the power shaft 46. The spring-pressed friction clutch hence effects a rolling-up of the material upon the core 108, at the same time allowing for slippage to compensate for variation in the size of the roll as the same increases.

From the foregoing construction and mechanism it will be seen that the seam with its opened-up, pasted down free edges C and D, is transposed from a position at one side edge of the tube to a position centrally of the tube after passing over the inclined roller 100 so that the convolutions when wound upon the core 108, operate in conjunction with each other to maintain the flattened-out, pasted-down condition until the paste has had an opportunity to dry and set. The tension arms 106 serve to stretch the tube at right angles to the stitching between the point of take-off of the rollers 32 and 33 and the inclined guide 100, thus obviating any possibility of a tension being exerted on the material which would tend to separate the pasted down seams from the main body.

I claim:

1. A machine for forming tubular materials from a strip comprising, in combination, means for joining the edges by a stitched seam, means for applying an adhesive to the free edges of the seam, and means for opening up and securing the free edges of the seam against the body of the strip.

2. A machine for forming tubular materials from a strip comprising, in combination, means for joining the edges by a stitched seam, means for applying an adhesive to the free edges of the seam, means for opening up and securing the free edges of the seam against the body of the strip, and means for taking off and rolling up said material to dispose the seamed portion centrally whereby the seam is maintained in a flattened-out, secured-down condition until the adhesive has set.

3. A machine for forming tubular materials from a strip comprising, in combination, means for joining the edges by a stitched seam, means for applying an adhesive to the free edges of the seam, means for opening up and securing the free edges of the seam against the body of the strip, and means for taking off and rolling up said material to dispose the seamed portion centrally whereby the seam is maintained in a flattened-out, secured-down condition until the adhesive has set, said latter means comprising an inclined guide element over which the material is trained, a driven core upon which the material is wound, and means interposed between the take-off point of the machine and said inclined guide element for stretching the tubular material at a right angle to the stitched seam.

4. The combination with a sewing machine for joining the edges of materials by a stitched seam, of means for opening up and pasting down the free edges of the material beyond the seam, said means including a seam-pasting device and a seam-opening element positioned to enter between the free edges outside of the sewed seam after the pasting operation.

5. A machine of the character described, comprising mechanism for joining the edges of materials by a stitched seam, a pasting device for applying paste to the outer faces of the edges of the material, a seam-opening means positioned to enter between the free edges outside of the stitched seam, seam-pressing means and a take-off mechanism operable with the seam stitching mechanism synchronously for feeding the material through the seam-pasting opening and pressing means.

6. A machine of the character described comprising mechanism for joining the edges of materials by a stitched seam, a pasting device for applying paste to the outer faces of the edges of the material, a seam-opening means positioned to enter between the free edges outside of the stitched seam, seam-pressing means and a take-off mechanism operable with the seam stitching mechanism synchronously for feeding the material through the seam-pasting, opening and pressing means, the said seam-pressing means and take-off mechanism feeding means being relatively offset laterally with respect to the path of movement of the material whereby to produce a slack in the material to relieve the same of strains or stresses.

7. A machine of the character described comprising a seam-stitching means, a paste-applying means, a seam-opening means, a seam-flattening and pressing means, a take-off mechanism including means for feeding the material through the seam-pasting, opening and pressing means, and an offset guide element with which the seam-opening and pressing means coact to allow for the necessary slack to compensate for the spreading of the seamed portion during its passage from the pasting position to the take-off mechanism.

8. In a machine of the character set forth including in combination, a sewing machine for joining the edges of materials by a stitched seam, means for applying paste to the outer surfaces of the material beyond the seam, means for opening up and pasting down the edges beyond the seam, means for pressing the pasted-down seamed edges and a take-off mechanism for feeding the material from the stitching means through the paste-applying, seam-opening and seam-pressing means.

9. In a machine of the character set forth including, in combination, a sewing machine for joining the edges of materials by a stitched seam, means for applying paste to the outer surfaces of the material beyond the seam, means for opening up and pasting down the edges beyond the seam, means for pressing the pasted-down seamed edges, a take-off mechanism for feeding the material from the stitching means through the paste-applying, seam-opening, and pressing means and a common synchronized driving means for actuating the stitching means and take-off mechanism at the same rate of speed.

10. The combination with a sewing machine for joining together the edges of materials by a stitched seam and including a feeding means, of an attachment for opening up and pasting down the free edges beyond the seam comprising a pasting unit, a seam-opening member, a plurality of pressing rollers and a take-off mechanism including feeding rollers, and a laterally inwardly offset guide arm over which the bight of the material formed by the seam is moved and between which and the seam opening member and pressing rollers, the material is fed.

11. The combination with a sewing machine for joining together the edges of materials by a stitched seam and including a feeding means, of an attachment for opening up and pasting down the free edges beyond the seam, comprising a pasting unit, a seam-opening member, a plurality of pressing rollers and a take-off mechanism including feeding rollers, and a laterally inwardly curved guide arm over which the bight of the material formed by the seam is moved and between which and the seam-opening member and pressing rollers, the material is fed, the said pasting unit including a paste reservoir having projecting nozzles from one of its walls and intermeshing paste-applying rollers mounted within the reservoir and protruding from the confronting faces of the nozzles, and a fin carried by said arm having an edge extending into the bight formed by the seamed material for guiding the seam through the paste-applying rollers.

12. In a machine for forming tubular materials from a flat strip of material, the combination of means for joining the longitudinal edges of said material by a stitched seam, means for applying an adhesive to the outer surfaces of the free edges of the material extending beyond the seam, means for opening up and turning down the adhesive-coated faces of said edges against the body of said material, means for pressing said edges to effect the adhesive connection of the same with the body, and mechanism for taking off and rolling up said material, including guide means for effecting the disposition of the seamed portion from its initial position at one side of the tube to a position centrally thereof, whereby the convolutions upon the roll operate to maintain the edges in their flattened-out turned-down condition until the adhesive has set.

13. A machine of the character described, comprising a stitching mechanism for joining the longitudinal edges of a strip of material by a stitched seam to produce a tube, paste-applying means between which the outer surfaces of the free edges are trained to apply the paste, a guide element over which the tube thus formed is fed, having lateral inwardly offset surfaces over which the bight formed by the stitched seam engages, a seam-opening device for separating the free edges and turning the same down against the guide element, and means co-operating with said guide element for pressing the pasted faces against the main body of the tube.

14. A machine of the character described, comprising a stitching mechanism for joining the longitudinal edges of a strip of material by a stitched seam to produce a tube, paste-applying means between which the outer surfaces of the free edges are trained to apply the paste, a guide element over which the tube thus formed is fed, having lateral inwardly offset surfaces over which the bight formed by the stitched seam engages, a seam-opening device for separating the free edges and turning the same down against the guide element, and means co-operating with said guide element for pressing the pasted surfaces against the main body of the tube; in combination with a mechanism for taking off and rolling up said material including guides for transposing the stitched seamed portion from its initial position at one side of the tube to a medial portion thereof.

15. A machine of the character described, comprising a stitching mechanism for joining the longitudinal edges of a strip of material by a stitched seam to produce a tube, paste-applying means between which the outer surfaces of the free edges are trained to apply the paste, a guide element over which the tube thus formed is fed, having lateral inwardly offset surfaces over which the bight formed by the stitched seam engages, a seam-opening device for separating the free edges and turning the same down against the guide element, and means co-operating with said guide element for pressing the pasted surfaces against the main body of the tube; in combination with a mechanism for taking off and rolling up said material including guides for transposing the stitched seamed portion from its initial position at one side of the tube to a medial portion thereof, and a common driving means for the stitching mechanism the paste-applying means, the pressing means, and the take-off and rolling-up mechanism.

16. The combination with a sewing machine including stitching and feeding mechanisms for joining pieces of material by a stitched seam, of means offset with respect to said stitching and feeding mechanisms of the sewing machines for opening up the portions of the material inside of the line of stitching, and a seam-opener engaging between the free edges of the seam and co-operating with said means for folding back said free edges against said portions.

17. The combination with a sewing machine including stitching and feeding mechanisms for joining the edges of materials by a stitched seam, of a member disposed inside of the line of stitching having a leading edge in alinement with the stitching mechanism, a following edge offset inwardly with respect thereto, and a laterally inclined edge joining the leading and following edges, seam-opening means engaging between the free edges of the seam outside of the line of stitching and disposed alongside of the laterally inclined edge to co-operate therewith in effecting the opening up of the portions of the materials inside of the line of stitching and the opening up of the free edges of the seam against said portions.

18. The combination with a sewing machine including stitching and feeding mechanisms for joining the edges of materials by a stitched seam, of a member disposed inside of the line of stitching having a leading edge in alinement with the stitching mechanism, a following edge offset inwardly with respect thereto, and a laterally inclined edge joining the leading and following edges, seam-opening means engaging between the free edges of the seam outside of the line of stitching and disposed alongside of the laterally inclined edge to cooperate therewith in effecting the opening up of the portions of the materials inside of the line of stitching and the opening up of the free edges of the seam against said portions, and pressing means alongside of the inwardly offset following edge and engaging the free opened up edges of the seam for pressing the same against said portions.

19. The combination with a sewing machine including stitching and feeding mechanisms for joining the edges of materials by a stitched seam, of a guide member disposed inside of the line of stitching and having a guide face disposed in alinement with the stitched seam and a second guide face extending from the first-mentioned guide face laterally, and seam-opening means engage between the free edges of the seam outside of the line of stitching at the juncture of said guide faces to co-operate with the guide member to effect the simultaneous opening up of the portions of material inside of the line of stitching and the opening up of the free edges of the seam against said portions.

20. A machine for forming tubular material from a strip, comprising in combination with mechanism for joining the edges by a stitched seam, means for applying an adhesive to the free edges of the seam, and means offset laterally with respect to the stitching mechanism for opening up and securing down the free edges of the seam against the body of the tubular material thus formed.

PERCY GARDNER.